United States Patent
Weis et al.

Patent Number: 5,355,402
Date of Patent: Oct. 11, 1994

[54] SYSTEM FOR ESTABLISHING A CONNECTION BETWEEN PRIVATE BRANCH EXCHANGES

[75] Inventors: Bernd Weis, Korntal; Karl-Albert Turban, Leonberg; Monika Bezler, Stuttgart; Manfred Schulz, Hammingen; Gerd Siegmund, Stuttgart, all of Fed. Rep. of Germany

[73] Assignee: Alcatel N.V., Netherlands

[21] Appl. No.: 6,808

[22] Filed: Jan. 21, 1993

[30] Foreign Application Priority Data

Jan. 22, 1992 [DE] Fed. Rep. of Germany ....... 4201561

[51] Int. Cl.$^5$ ........................................... H04M 11/00
[52] U.S. Cl. ........................................ 379/61; 379/58; 379/63
[58] Field of Search ............... 455/56.1, 34.1; 379/58, 379/61, 63, 219, 225

[56] References Cited

U.S. PATENT DOCUMENTS

| | | |
|---|---|---|
| 3,912,875 | 10/1975 | Katz . |
| 4,233,473 | 11/1980 | Frost ................................... 455/31 |
| 4,284,848 | 8/1981 | Frost ................................... 455/11 |
| 4,955,050 | 9/1990 | Yamauchi ............................. 379/59 |
| 4,980,907 | 12/1990 | Raith et al. .......................... 379/63 |
| 5,040,177 | 8/1991 | Martin et al. ..................... 370/110.1 |
| 5,133,001 | 7/1992 | Böhm ................................... 379/58 |
| 5,202,912 | 4/1993 | Breeden et al. ..................... 379/61 |

FOREIGN PATENT DOCUMENTS

| | | |
|---|---|---|
| 0159423 | 10/1985 | European Pat. Off. . |
| 0374787 | 6/1990 | European Pat. Off. . |
| 3528886 | 2/1987 | Fed. Rep. of Germany . |
| 3843565 | 1/1990 | Fed. Rep. of Germany . |
| 4113596 | 7/1991 | Fed. Rep. of Germany . |
| 2236454 | 4/1991 | United Kingdom . |

OTHER PUBLICATIONS

"Verbindungsverkehr zwischen Fernsprech–Nebenstellenanlagen–Netzplanung, Numerierung und Übertragungstechnik", V. Jäger et al, *Telefon Report 13*, (1977) Heft 2, pp. 55–60.

"A Business Cordless PABX Telephone System on 800 MHz Based on the DECT Tecnhology" by Colin Buckingham, et al, published in the Jan. 1991 IEEE Communications Magazine, pp. 105–110.

*Primary Examiner*—Curtis Kuntz
*Assistant Examiner*—I. S. Rana
*Attorney, Agent, or Firm*—Ware, Fressola, Van Der Sluys & Adolphson

[57] ABSTRACT

An installation is described for establishing a connection between private branch exchanges (PABX), each of which has a base station allocated within a determined geographic area (GA), where the base station provides a determined number of utilization channels served by telecommunication, through which mobile cordless terminals communicate with the base station, and thereby with the branch exchange, throughout the geographic area. The base station ($BS_2$) of a second branch exchange ($PABX_2$) is located within the geographic area (GA) of a base station ($BS_1$) of a first branch exchange ($PABX_1$), and a wireless cross linkage is established by the two base stations ($BS_1$, $BS_2$) and their telecommunication ($PABX_1$, $PABX_2$).

1 Claim, 1 Drawing Sheet

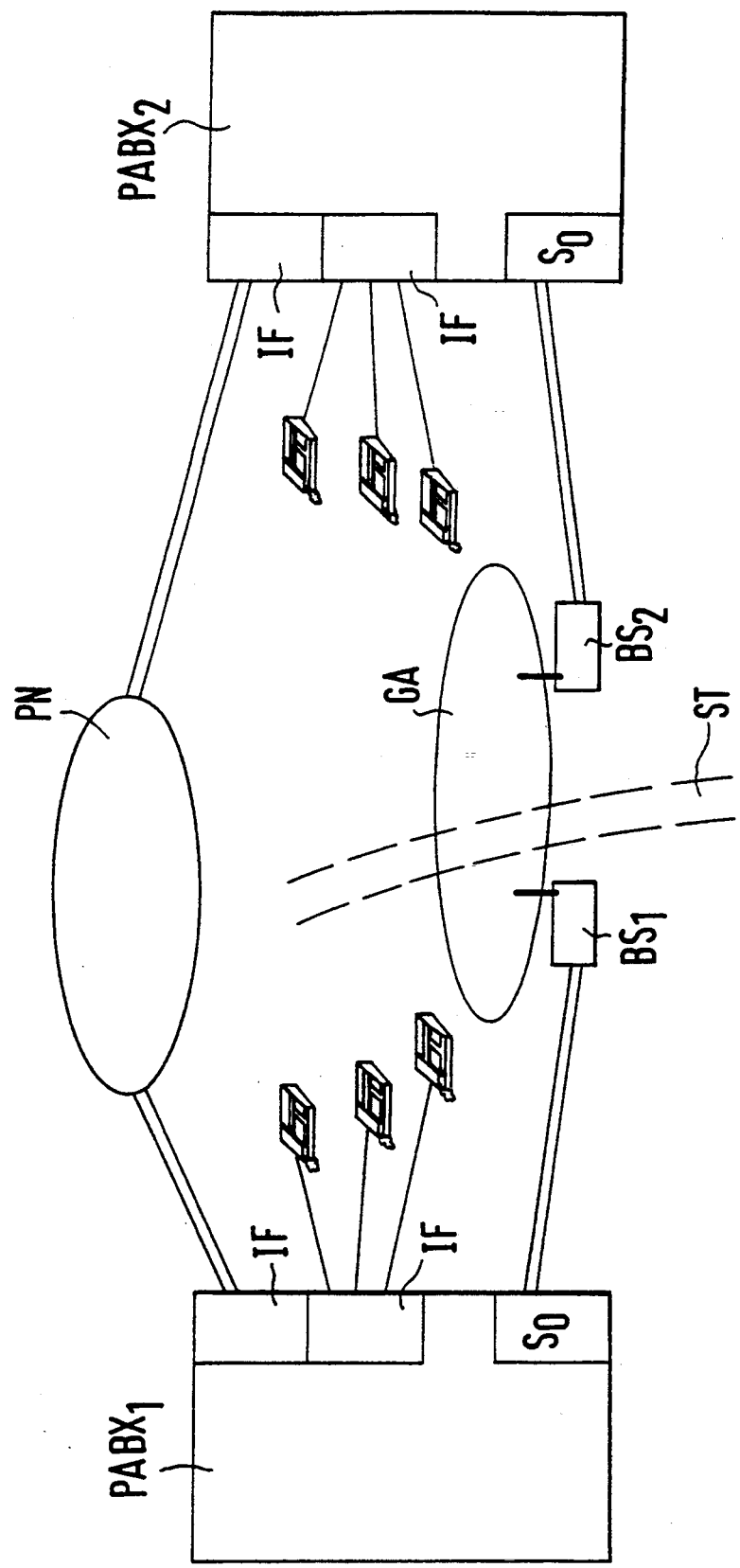

SYSTEM FOR ESTABLISHING A CONNECTION BETWEEN PRIVATE BRANCH EXCHANGES

TECHNICAL FIELD

The invention concerns a system for establishing a connection between private branch exchanges, each having an associated base station in a specific geographic area, which makes available a given number of telecommunication channels, via which mobile cordless terminals in the geographic area can communicate with the base station and thereby with the branch exchange.

1. Background of the Invention

Until now, if a public property, e.g. a street, was geographically located between the branch exchanges, the connection of private branch exchanges was only possible via the public telephone network.

2. Disclosure of Invention

The invention has the task of creating a cross linkage between branch exchanges without using the hardwired public telephone network.

The invention fulfills this task by placing the base station of a second branch exchange in the geographic area of a base station in a branch exchange, forming a wireless cross linkage by telecommunicating between the two base stations.

The invention thus creates a wireless cross linkage of different telecommunication connections, potentially over a public property or inside the property itself, by using the base stations connected to the individual telecommunication installations for one or several cross linkage lines instead of using them for mobile terminals (telephones). Therefore, this cross linkage does not need to use costly hard-wired connections via the public telephone network. This can possibly provide more cost-effective solutions within a defined property owned by a user, as compared to hard-wired connections. This is made possible, for example, within the framework of the Digital European Cordless Telecommunication system (DECT), which makes available a specific number of utilization channels for mobile terminals (telephones) within the geographic area of the respective base station of its branch exchange (PABX), (see the general premises of C. Buckingham, G. K. Wolterink, D. Akerberg, A Business Cordless PABX Telephone System on 800 MHz, based on the DECT Technology, January 1991, IEEE Communications Magazine, pages 105–110).

These and other objects, features and advantages of the present invention will become more apparent in light of the following detailed description of a best mode embodiment thereof, as illustrated in the accompanying drawing.

BRIEF DESCRIPTION OF THE DRAWING

The sole Figure shows two branch exchanges wherein a radio link is provided therebetween, according to the present invention.

BEST MODE FOR CARRYING OUT THE INVENTION

The single figure shows first and second branch exchanges $PABX_1$ and $PABX_2$ (PABX=Private Automatic Branch Exchange). Several base stations are allocated through interfaces to each of the two branch exchanges, among them base stations $BS_1$ or $BS_2$. These base stations cover a specific geographic area GA by telecommunication, in other words wireless, e.g. 30 m inside buildings, or a radius of 300 m in the open. Each base station provides a specific number of equal channels for communication within this geographic area. With DECT, for example, the number of channels is 12. These geographic areas of the base station form overlapping cells at the edges, which supply a larger area of a branch exchange. Telecommunication is supplied to mobile telephone terminals within the cells. As shown in the drawing, the PABX branch exchanges can also be connected to normal telephones by wire lines through interfaces IF.

According to the invention, the base station $BS_2$ of the second branch exchange $PABX_2$ is located within the range of a base station $BS_1$, which is allocated to the first branch exchange $PABX_1$, so that wireless communication between the two base stations $BS_1$ and $BS_2$ establishes a—wireless—communication between the two branch exchanges $PABX_1$ and $PABX_2$. A base station $BS_1$ or $BS_2$ not only provides communication with a determined number of mobile telephones, but also with another base station. This establishes a cross linkage between the branch exchanges $PABX_1$ and $PABX_2$. Thus, the geographic area that is covered by a base station of a PABX within, for example, the DECT framework controls a base station of another PABX branch exchange through telecommunication. A telecommunication installation to telecommunication installation connection over land is established, e.g. across a street ST, which obviates or makes the heretofore required connection of branch exchange installations via a public network PN redundant.

The two base stations $BS_1$ and $BS_2$ communicate with each other, for example, in the form provided by the DECT framework, which starts from the fact that each base station is connected to other devices (namely mobile telephones), by making available a determined number of utilization channels, while in this instance the connection does not take place between base station BS and a mobile telephone as the terminal, but between two base stations.

In this manner, by utilizing the standardization furnished by DECT or similar schemes, private PABX branch exchanges can be cross linked via the base stations provided therein.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. A system for establishing a connection between private branch exchanges each having an associated base station connected thereto by a transmission link in a specific geographic area, said base station making available a given number of information-carrying radio channels via which mobile cordless terminals in said geographic area can enter into communication with said base station and with the associated connected exchange, wherein within the geographic area of a base station of a first private branch exchange, a base station of a second private branch exchange is located, and that a radio link is provided between said two base stations over a selected number of said given number of radio channels whereby said private branch exchanges are connected to each other through said transmission links, through said associated base stations and over said radio link.

* * * * *